United States Patent [19]
Dong et al.

[11] Patent Number: 5,651,077
[45] Date of Patent: Jul. 22, 1997

[54] AUTOMATIC THRESHOLD DETERMINATION FOR A DIGITAL SCANNER

[75] Inventors: Mimi Chu Dong, Greeley; Kevin S. Burke, Fort Collins; Lynn J. Formanek, Cort Collins, all of Colo.

[73] Assignee: Hewlett-Packard Company, Palo Alto, Calif.

[21] Appl. No.: 171,122

[22] Filed: Dec. 21, 1993

[51] Int. Cl.[6] .................................................. G06K 9/38
[52] U.S. Cl. .......................... 382/172; 382/169; 382/271; 364/736.01
[58] Field of Search ................................ 382/51, 13, 9, 382/8, 6, 18, 48, 172, 165, 169, 204, 291, 295, 271; 364/736, 413.02

[56] References Cited

U.S. PATENT DOCUMENTS

| | | | |
|---|---|---|---|
| 3,755,780 | 8/1973 | Sammon et al. | 382/18 |
| 4,577,235 | 3/1986 | Kannapell et al. | 358/280 |
| 4,601,057 | 7/1986 | Tsuji et al. | 382/172 |
| 4,668,995 | 5/1987 | Chen et al. | 358/282 |
| 4,742,557 | 5/1988 | Ma | 382/172 |
| 4,817,169 | 3/1989 | Peppers et al. | 382/9 |
| 4,897,880 | 1/1990 | Wilbert et al. | 382/13 |
| 4,975,970 | 12/1990 | Zettel et al. | 382/6 |
| 5,067,163 | 11/1991 | Adachi | 382/6 |
| 5,073,953 | 12/1991 | Westdijk | 382/9 |
| 5,086,485 | 2/1992 | Lin | 382/172 |
| 5,093,871 | 3/1992 | Klein et al. | 382/172 |
| 5,131,049 | 7/1992 | Bloomberg et al. | 382/9 |
| 5,179,599 | 1/1993 | Formanek | 382/51 |
| 5,200,915 | 4/1993 | Hayami et al. | 364/736 |
| 5,327,262 | 7/1994 | Williams | 358/462 |
| 5,337,373 | 8/1994 | Marandici et al. | 382/172 |
| 5,351,313 | 9/1994 | Bessho et al. | 382/172 |
| 5,371,810 | 12/1994 | Vaidyanathan | 382/204 |
| 5,377,020 | 12/1994 | Smitt | 382/172 |
| 5,481,620 | 1/1996 | Vaidyanathan | 382/169 |

OTHER PUBLICATIONS

IEEE Transactions on Systems, Man and Cybernetics, Dec. 1978, USA, vol. SMC-8, No. 12, ISSN 0018-9472, pp. 895-898, Ahuja N et al "A note on the use of second-order gray-level statistics for threshold selection".

Gonzales et al., "Digital Image Processing," 1992, pp. 458-465.

Primary Examiner—Jose L. Couso
Assistant Examiner—Anh Hong Do

[57] ABSTRACT

A computer-based system and method automatically determines a threshold level for each cell of a digital document having one or more cells. Each cell of the document has a plurality of pixels and each pixel has associated therewith a plurality of bits to represent a graylevel for that pixel. A co-occurrence matrix indicating a quantity of each pixel graylevel pair in the cell is constructed. From this matrix, a first histogram is constructed and used to determine a background and a foreground peak for the cell and the features for these peaks. The center of mass for the cell is determined based on these features and is used to determine the threshold level for the cell.

16 Claims, 17 Drawing Sheets

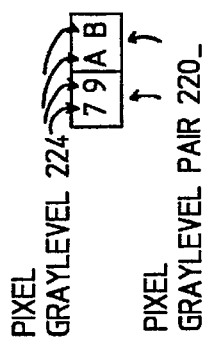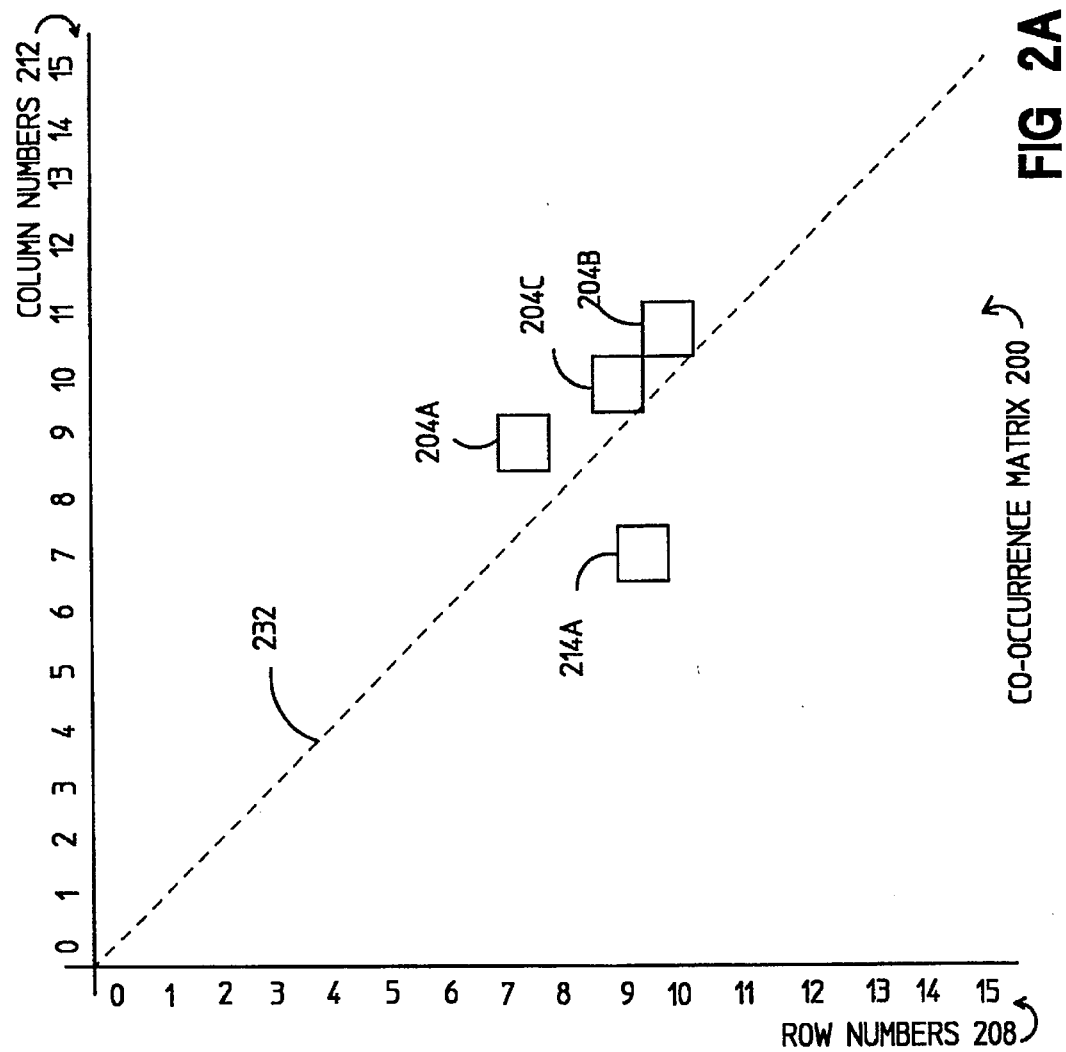

FIG 4

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 9 | 0 |
| 13 | 0 | 0 | 0 | 0 | 0 | 0 | 0 | 0 | 0 | 0 | 2 | 8 | 29 | 42 | 104 | 29 | 0 | 0 |
| 12 | 0 | 0 | 0 | 0 | 0 | 0 | 0 | 0 | 7 | 10 | 9 | 12 | 7 | 0 | 0 | 0 |
| 11 | 0 | 0 | 0 | 0 | 0 | 0 | 0 | 13 | 9 | 9 | 5 | 0 | 0 | 0 | 0 | 0 |
| 10 | 0 | 0 | 0 | 0 | 0 | 0 | 14 | 13 | 17 | 9 | 5 | 0 | 0 | 0 | 0 | 0 |
| 9 | 0 | 0 | 0 | 0 | 0 | 11 | 37 | 19 | 12 | 4 | 0 | 0 | 0 | 0 | 0 | 0 |
| 8 | 0 | 0 | 0 | 0 | 4 | 33 | 28 | 20 | 4 | 0 | 0 | 0 | 0 | 0 | 0 | 0 |
| 7 | 0 | 0 | 0 | 0 | 13 | 36 | 24 | 10 | 0 | 0 | 0 | 0 | 0 | 0 | 0 | 0 |
| 6 | 0 | 0 | 0 | 0 | 33 | 61 | 25 | 0 | 0 | 0 | 0 | 0 | 0 | 0 | 0 | 0 |
| 5 | 0 | 0 | 0 | 2 | 95 | 0 | 72 | 0 | 0 | 0 | 0 | 0 | 0 | 0 | 0 | 0 |
| 4 | 0 | 0 | 0 | 7 | 103 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |

EXAMPLE CO-OCCURRENCE MATRIX 400

| COLUMN NUMBER 622 → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ELEMENT 642 → | 0 | 0 | 0 | 0 | 103 | 228 | 110 | 54 | 36 | 25 | 23 | 26 | 61 | 175 | 38 | 0 |

ONE-DIMENSIONAL HISTOGRAM 600

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 |   |   |   |   |   |   |   |   |   |   |    |    |    |    |    |    |
| 1 |   |   |   |   |   |   |   |   |   |   |    |    |    |    |    |    |
| 2 |   |   |   |   |   |   |   |   |   |   |    |    |    |    |    |    |
| 3 |   |   |   |   | 7 | 2 |   |   |   |   |    |    |    |    |    |    |
| 4 |   |   |   |   | 103 | 95 | 33 | 13 |   |   |    |    |    |    |    |    |
| 5 |   |   |   |   |   |   | 72 | 61 | 36 | 11 |    |    |    |    |    |    |
| 6 |   |   |   |   |   |   | 25 | 24 | 33 | 37 | 14 |    |    |    |    |    |
| 7 |   |   |   |   |   |   |   | 10 | 28 | 19 | 13 | 13 |    |    |    |    |
| 8 |   |   |   |   |   |   |   |   | 20 | 37 | 17 | 9  | 0  |    |    |    |
| 9 |   |   |   |   |   |   |   |   | 4 | 4 | 9 | 9 | 7  | 2  |    |    |
| 10|   |   |   |   |   |   |   |   |   | 12 | 5 | 9 | 10 | 8  |    |    |
| 11|   |   |   |   |   |   |   |   |   |   | 4 | 5 | 9  | 29 |    |    |
| 12|   |   |   |   |   |   |   |   |   |   |   |   | 12 | 42 |    |    |
| 13|   |   |   |   |   |   |   |   |   |   |   |   | 7  | 104| 29 |    |
| 14|   |   |   |   |   |   |   |   |   |   |   |   |    |    | 9  |    |
| 15|   |   |   |   |   |   |   |   |   |   |   |    |    |    |    |    |

ELEMENT 204 (TYP) → 4

208 ROW NUMBER

EXAMPLE CO-OCCURRENCE MATRIX 400

INFLUENCE TABLE

| DELTA | STRONG INFLUENCE | NORMAL INFLUENCE | WEAK INFLUENCE |
|---|---|---|---|
| ≤4 | 10 | 0 | 0 |
| 5 | 5 | 5 | 0 |
| 6 | 0 | 10 | 0 |
| 7 | 0 | 5 | 5 |
| ≥8 | 0 | 0 | 10 |

FIG 14

WEIGHT TABLE

| DEVIATION | THICK | | NORMAL | | THIN | | VERY THIN | |
|---|---|---|---|---|---|---|---|---|
| <7 | 10 | | 0 | | 0 | | 0 | |
| <18 | <0, >10 | ELSE | <0, >10 | ELSE | 0 | | 0 | |
|  | 0 | -2X+22 | 0 | $\frac{5X-45}{4}$ | | | | |
| <26 | 0 | | <0, >10 | ELSE | <0, >10 | ELSE | 0 | |
|  | | | 0 | -2X+44 | 0 | -X-15 | | |
| <35 | 0 | | 0 | | 0 | $\frac{-10X+310}{6}$ | <0, >10 | ELSE |
|  | | | | | | | 0 | $\frac{-5X+130}{4}$ |

FIG 15

AUTOMATIC THRESHOLD DETERMINATION FOR A DIGITAL SCANNER

CROSS-REFERENCE TO OTHER APPLICATION

This application is related to a commonly owned application entitled "Automatic Threshold Determination For A Digital Scanner," Ser. No. 08/171,122, filed on even date herewith, the full disclosure of which is incorporated herein by reference as if reproduced in full elow.

BACKGROUND OF THE INVENTION

1. Field of the Invention

The present invention relates generally to digital image scanners and more specifically to a method and system for automatically determining the brightness threshold for multiple portions of a scanned page.

2. Related Art

Digital scanners are often used to digitize document pages so the text thereon can be manipulated using a computer. For example, a scanner coupled to an optical character recognition device can be used to digitize text and put it into a format recognized by a word processing program. This allows an operator to revise or modify the document using the word processor. This process of scanning and digitizing text is often referred to as optical character recognition (OCR).

Contemporary black and white digitizing scanners typically convert a document (i.e. one or more pages of text and/or graphics) into a plurality of pixels each represented by a certain number of bits for a given resolution. The bits of each pixel refer to a graylevel of that pixel. Thus, for an eight bit format (i.e., eight bits per pixel), 256 colors (or shades of gray) can be represented for each pixel. One common format is to use four bits per pixel to represent a total range of 0 to 15, where 0 (or 15) is pure black and 15 (or 0) is pure white.

When an image is scanned and digitized, the scanner first determines the graylevel for each pixel. The graylevel is the level of brightness of that pixel. For example, for 64 shades of gray, a graylevel of 0 (digital 000000) may indicate white while a graylevel of 63 (digital 111111) indicates black. All graylevels in between these limits represent the shades of gray between black and white.

For digitizing simple text and line drawings, only two colors need to be represented. For example, the page may have simple black text on a plain white background. For such bi-level pages, only one bit per pixel is needed for the digital image to accurately represent the scanned page. In this one-bit-per-pixel format, each pixel is either black or white (which can be represented by a binary 1 or 0). Storing a digital image with only one bit per pixel is more efficient than storing the image with multiple bits per pixel.

To obtain this more efficient one-bit-per-pixel representation from the multiple-bit-per-pixel format produced by the digitizer, a threshold level must be determined. For example, scanned pixels having a graylevel below the threshold level will be set to appear as background (e.g., white), while pixels having a graylevel above threshold will be set to appear as foreground matter (e.g., black).

One technique used with conventional scanners is to have a human operator manually adjust the threshold level (sometimes called intensity or brightness) for a document to be scanned. For clean documents having dark foreground (e.g. clear text) and a light background, the threshold level is easily determined and is not critical for accurate reproduction. However, for documents having poor contrast between foreground and background or having text with very thin lines, accurate threshold determination is critical for performing OCR.

An additional problem with a manual determination and setting of the threshold level is that an operator is required to estimate the correct setting in advance and then, perhaps by trial and error, make adjustments to optimize the quality of the scanned document. This can lead to wasted time.

A further problem with this conventional solution is that the threshold is determined for the entire page being scanned. If one threshold level would be appropriate for one area of the page and a second level would be better for a second area, one portion of the page would not be of optimum quality.

SUMMARY OF THE INVENTION

The present invention is directed toward a system and method for automatically determining the threshold level of a digitizing scanner. A scanned page is divided into cells. Each cell is digitized into an array of pixels, wherein each pixel is represented by a plurality of bits. The bits represent the graylevel of the pixel.

The first step in determining the threshold is to construct a co-occurrence matrix. The co-occurrence matrix is a two-dimensional matrix indicating the number of pixels at each graylevel that are adjacent to pixels at another graylevel. One-dimensional histograms and other features of the cell are extracted from the co-occurrence matrix.

The one-dimensional histogram extracted from the co-occurrence matrix is used to determine the graylevel of the foreground and background peaks of the scanned cell. The histogram is then used to determine how sharp and how broad the peaks are. These features of the peaks indicate the extent of the peaks. The determination is based on the number of pixels at graylevels of each peak.

Once the extent of the peaks is determined, the delta between the peaks can be determined. The delta is an indication of the difference between the foreground peak and the background peak. The delta takes into account the extent of the two peaks. The delta is then used to determine the influence of the background and foreground peaks in the cell. This influence can be determined by performing a simple table lookup based on the value of the delta.

A second one-dimensional histogram is used in conjunction with the co-occurrence matrix to determine the deviation of the foreground peak. This second one-dimensional histogram is created by collapsing the co-occurrence matrix and summing the rows of the collapsed matrix. Each sum is entered into the element of the second one-dimensional histogram that corresponds to the summed row. This second one-dimensional histogram is used to calculate the deviation of the foreground peak. The deviation is then used to determine the weight of the foreground.

Using the influences and the weights for the cell, values are determined to be used in calculating the center of mass for the cell. The center of mass is then used to determine the threshold for the system.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit(s) of a reference number identifies the drawing in which the reference number first appears.

FIG. 2A is a diagram illustrating the structure of a co-occurrence matrix.

FIG. 2B is a diagram illustrating pixel graylevel pairs used to complete a co-occurrence matrix.

FIG. 4 illustrates an example of a completed co-occurrence matrix for a cell.

FIG. 6 illustrates an example of a one dimensional histogram constructed using the co-occurrence matrix illustrated in FIG. 4.

FIG. 8 illustrates the manner in which the co-occurrence matrix illustrated in FIG. 4 is used to construct the one-dimensional histogram illustrated in FIG. 6.

FIG. 11 illustrates the collapse of the example co-occurrence matrix to construct a second one-dimensional histogram.

FIG. 14 is a diagram illustrating the influence values for various delta values in one embodiment of the invention.

FIG. 15 is a diagram illustrating in tabular format the foreground weight for various deviation values in one embodiment of the invention.

DETAILED DESCRIPTION OF THE EMBODIMENTS

1. Overview and Discussion of the Invention

The present invention is directed to a method and system for automatically determining the correct threshold level for scanning and digitizing a document using an optical scanner. The scanner produces a digital image of each pixel on the document. This digital image can then be used by OCR software which converts the image to computer readable (e.g., ASCII) form. However, before the OCR software converts the image into computer readable form, the image must first be separated into text and background.

According to the invention, a page of a document is scanned. The scanned page is virtually divided into regions called "cells." Each cell is scanned and digitized into an array of pixels that are represented digitally. Depending on the number of colors (or shades of gray) desired, each pixel can be represented by one or several bits. The bits represent the shade or "graylevel" of the pixel.

A co-occurrence matrix is constructed that represents the number of adjacent graylevels in each cell. The co-occurrence matrix is collapsed, and the collapsed matrix is used to construct a one-dimensional matrix called a "histogram." From the histogram, the graylevel of the foreground and background peaks can be determined. The histogram is used to determine the extent of the peaks and the delta between the foreground and background peaks. A second one-dimensional histogram is extracted form the collapsed co-occurrence matrix to determine the deviation of the foreground peak. This information indicates the type of foreground (e.g. thin, very thin, thick, etc.) and the type of background (e.g. white, light color, dark color, etc.). A form of fuzzy logic is used to then determine the optimum threshold based on the deviation and the delta determined above.

The threshold value is used in subsequent operations to convert the scanned image from a multiple bit-per-pixel image to a one bit-per-pixel image. For example, scanned pixels having a graylevel below the threshold level are set to appear as background (e.g., white, with a single bit representation of 0) while pixels having a graylevel at or above the threshold are set to appear as foreground matter (e.g., black, with a single bit representation of 1).

This series of steps is performed for each cell so that a threshold level is calculated for each cell of the scanned page. By providing a separate threshold for each cell, spatial irregularities or inconsistencies in the image can be considered when setting the threshold for the entire image.

2. Automatic Threshold Determination

Figure 1:
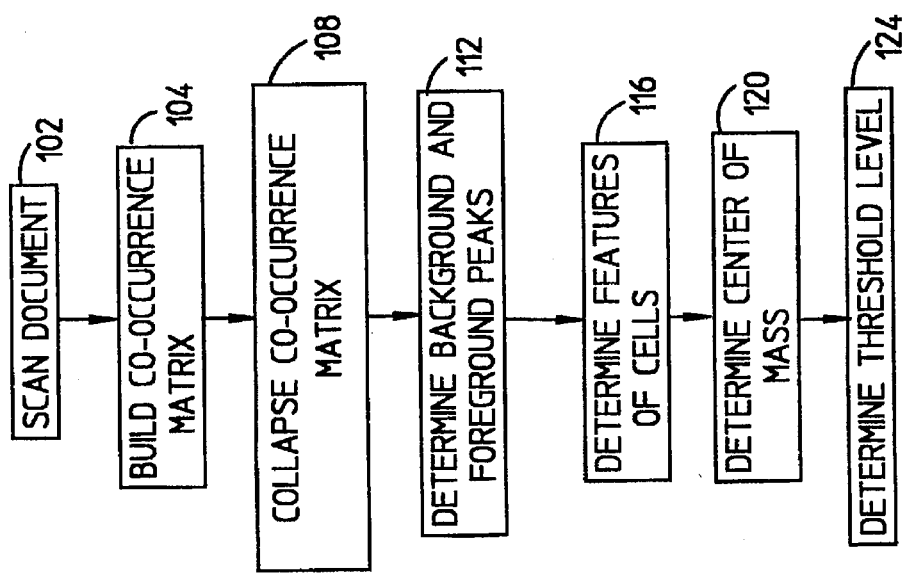
FIG. 1 is a high-level operational flow diagram illustrating the steps of determining a threshold level according to the present invention.

A high-level overview of the invention is briefly described above in terms of a series of steps followed in determining the threshold level for scanning a page. This is further illustrated in FIG. 1. FIG. 1 is an operational flow diagram illustrating the steps involved with determining the threshold level for a scanner according to one embodiment of the invention.

Referring now to FIG. 1, in a step 102, a page to be digitized is scanned by a digitizing scanner. The scanner operates at a resolution defined in part by the number of pixels per unit area (i.e. the "pixel density") used to represent the digitized image. For a greater pixel density, the scanned image can be represented at a higher resolution.

Each pixel is represented by one or more bits. The bits indicate the shading of the pixel. As discussed above, this is referred to as the graylevel of the pixel. If 8 bits per pixel are used, each pixel can be assigned a value representing one of two-hundred-and-fifty-six (256) graylevels. In the illustrated embodiment, 4 bits per pixel are used to represent one of sixteen (0–15) graylevels. Thus, each pixel is scanned and assigned a graylevel from zero (0) to fifteen (15); zero being the lightest (e.g., white) and 15 being the darkest (e.g., black).

In a step 104, a co-occurrence matrix is constructed for each cell of the page. The cell is a region of the page, the size of which is chosen by making a performance/quality tradeoff. If the cell size is designated as smaller (corresponding to a greater number of cells per page), more threshold determinations can be made for each page. Such a smaller designation provides an accurate threshold determination for smaller portions of the page.

Figure 3:
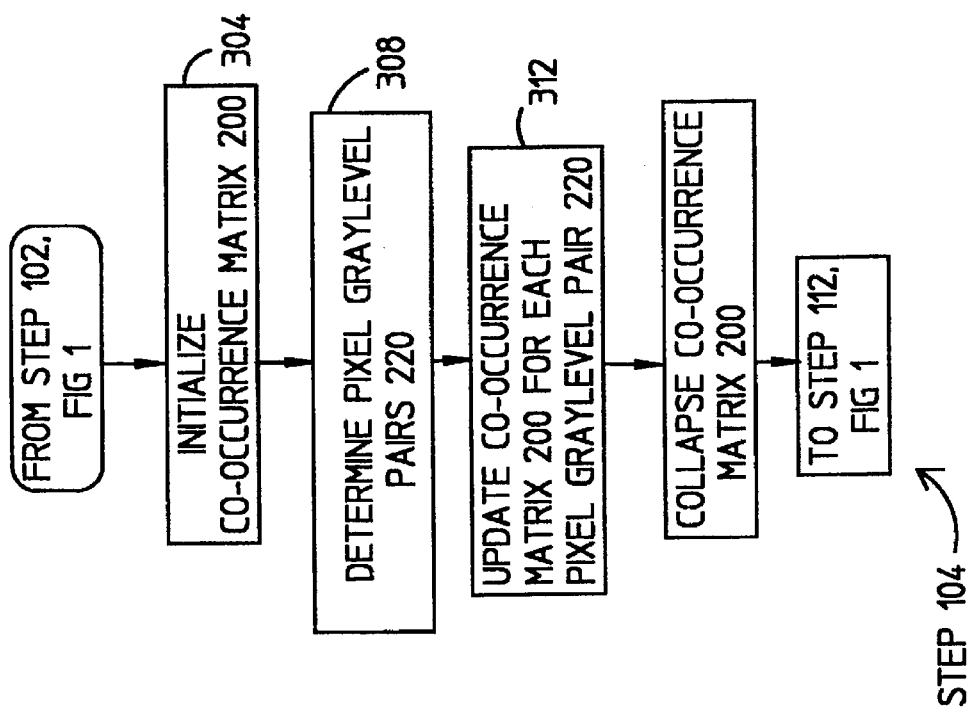
FIG. 3 is an operational flow diagram illustrating the steps of constructing a co-occurrence matrix for a cell.

The co-occurrence matrix and how it is constructed in step 104 is now described in greater detail. FIG. 2A is a diagram illustrating the framework of a co-occurrence matrix. FIG. 2b is a diagram illustrating the manner in which the graylevel value for each pixel is paired for use in constructing the co-occurrence matrix. FIG. 3 is an operational flow diagram illustrating the steps involved in constructing the co-occurrence matrix.

Referring now to FIG. 3, in a step 304, a co-occurrence matrix is constructed. Referring now to FIG. 2A, a co-occurrence matrix 200 is a symmetrical matrix having a number of rows and columns that is equal to the number of possible graylevels in each cell. Thus for a system using 4-bits per pixel, co-occurrence matrix 200 is a symmetrical 16×16 matrix. Each row is identified by a row number 208, and each column is identified by a column number 212.

At the intersection of each row and column is an element 204 of co-occurrence matrix 200. For example, three elements 204 are highlighted in FIG. 2A: at the intersection of row 7 and column 9 is element 204A; at the intersection of row 9 and column 10 is element 204C; and at the intersection of row 10 and column 11 is element 204B. These elements can also be referred to by their coordinates: for example, (7,9), (9,10), and (10,11), respectively.

In a step 304, each element 204 of co-occurrence matrix 200 is initialized to an initial value (such as zero (0)).

In a step 308, pixel graylevel pairs are determined. Referring now to FIG. 2B, when the document is scanned, the resultant pixel pattern can be paired into a pair of adjacent pixel graylevel values 224 referred to as a pixel graylevel pair 220. This pair indicates that a pixel of a first graylevel 224 value is adjacent to a pixel having a second graylevel 224 value. In the example illustrated in FIG. 2B, two pixel graylevel pairs are illustrated. A first pair 220 indicates that a pixel with a graylevel 224 of seven is next to a pixel having a graylevel 224 of nine. A second pair indicates that a pixel with a graylevel 224 of ten (represented by HEX A) is next to a pixel having a graylevel 224 of eleven (represented by HEX B).

Grouping of pixel graylevels 224 into pairs as illustrated in FIG. 2B describes only one possible embodiment of the invention. Additional and/or alternative groupings could be implemented. For example, additional pairs 220 could be defined using these same four pixels but in different combination. The inventors have determined that the marginal increase in scanned quality obtained by including these additional pair does not warrant the additional processing time required in subsequent steps to handle such an increase in the number of pairs 220.

In a step 312, the co-occurrence matrix 200 is updated using the pixel graylevel pairs 220 determined in step 308. The manner in which this is accomplished is now described. As described above, each pixel graylevel pair 220 indicates that a pixel having a first graylevel 224 is adjacent to another pixel having a second graylevel 224. Note that these two graylevels 224 that make up the pair 220 can be the same. For the example illustrated in FIG. 2B, one pair 220 indicates that a pixel having a graylevel 224 of seven is next to a pixel having a graylevel 224 of 9. For this pair 220 of seven and nine, element 204A (i.e. element (7,9)) of co-occurrence matrix 200 is incremented. Similarly, for each pair graylevel 220 (e.g. X and Y), the element 204 corresponding to the intersection of row X, column Y (e.g. element (X,Y)) is incremented.

Thus, each element 204 for each X,Y intersection contains a number indicating the number of times a pixel having a graylevel 224 of X is adjacent to a pixel having a graylevel 224 of Y.

Because the pair 220 indicates adjacent graylevels, a pair given by (X,Y) is the same as pair (Y,X). For example, a graylevel 224 of 7 next to a graylevel 224 of 9 is the same as a graylevel 224 of 9 next to a graylevel 224 of 7. Therefore, in a step 108 (referring back to FIG. 1) co-occurrence matrix 200 is collapsed such that only elements 204 on and above the main diagonal (represented by dashed line 232) of co-occurrence matrix 200 are incremented. For example, for the pairs (7,9) and (9,7), element 204A is incremented twice and an element 214 does not need to be incremented (because (7,9) is the same as (9,7)). Thus, only data in elements 204 on and above the main diagonal need to be processed.

An example of a co-occurrence matrix 200 with data from a cell inserted therein is illustrated in FIG. 4. Referring now to FIG. 4, in this example there are seven (7) occurrences of a pixel with a graylevel 224 of three (3) next to a pixel with a graylevel 224 of four (4) (see element 404), two (2) occurrences of a pixel with a graylevel 224 of three (3) next to a pixel with a graylevel 224 of five (5) (see element 408), one-hundred and three (103) occurrences of a pixel with a graylevel 224 of four (4) next to a pixel with a graylevel 224 of four (4) (see element 412), ninety-five (95) occurrences of a pixel with a graylevel 224 of four (4) next to a pixel with a graylevel 224 of five (5) (see element 416), and so on. As FIG. 4 illustrates, data is entered only into elements on and above the main diagonal of the matrix 200.

Figure 5:
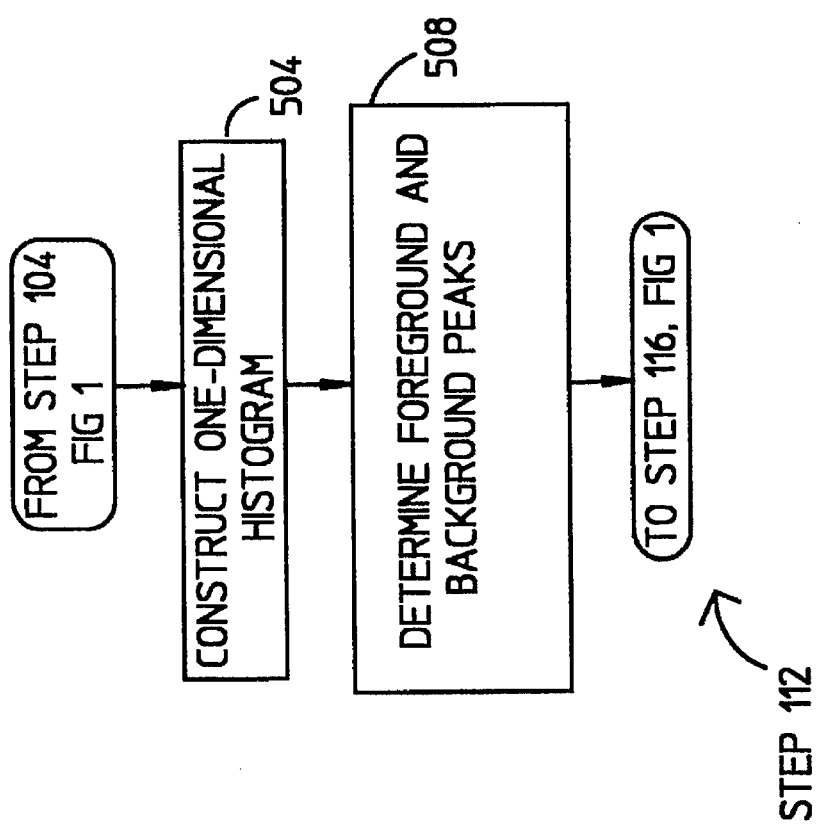
FIG. 5 is an operational flow diagram illustrating the steps of determining foreground and background peaks for a cell.

Referring back to FIG. 1, in a step 112, the background and foreground peaks of the scanned cell are determined. The manner in which this is accomplished is illustrated in FIG. 5. FIG. 5 is fin operational flow diagram illustrating the manner in which cell peaks are determined according to one embodiment of the invention.

Referring now to FIG. 5, in a step 504, a one-dimensional histogram of graylevel data is constructed using the co-occurrence matrix 200 (FIG. 2A). The one-dimensional histogram is used to determine where the foreground and background peaks are located in the scanned cell in a step 508. An example of a one-dimensional histogram is illustrated in FIG. 6. This example is constructed from the example co-occurrence matrix 400 (a specific example of generic matrix 200 in FIG. 2A) illustrated in FIG. 4.

The one-dimensional histogram 600 can be constructed in a number of different ways. It is typically constructed by summing proximate data points along the main diagonal of the co-occurrence matrix 200 for the cell. A preferred method by which the one-dimensional histogram 600 is constructed by summing proximate data points is illustrated in FIGS. 7 and 8.

Figure 7:
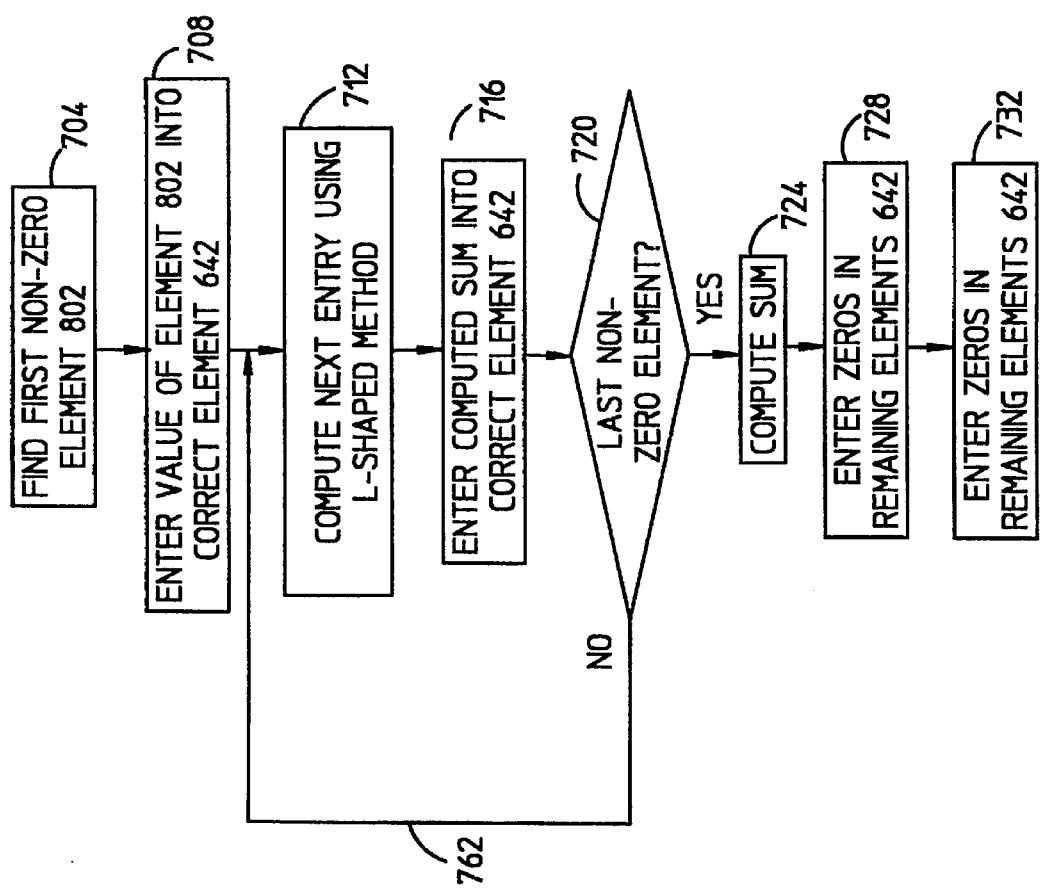
FIG. 7 is an operational flow diagram illustrating the manner in which a one-dimensional histogram is constructed from a co-occurrence matrix.
Figure 8:
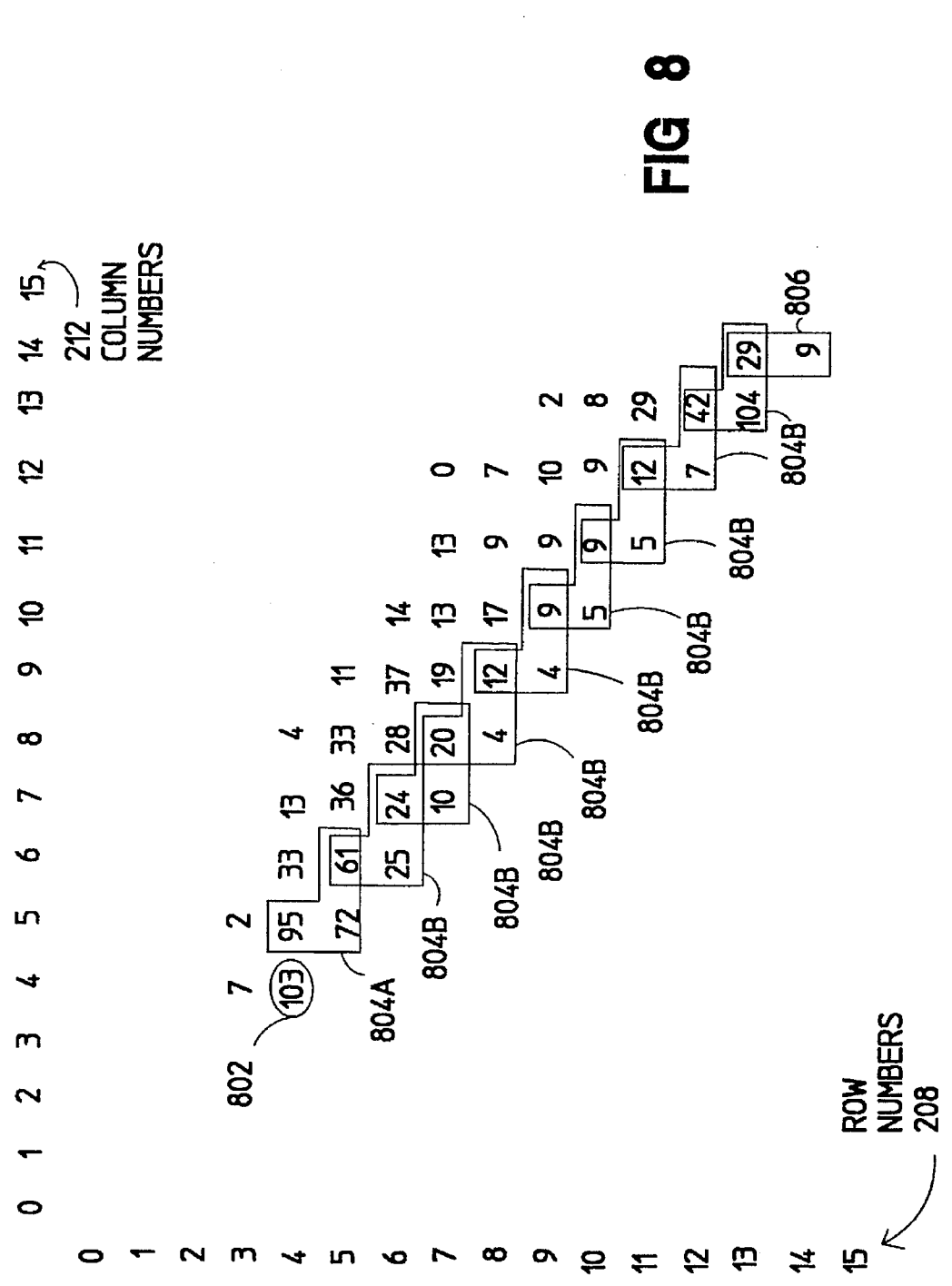

Referring now to FIGS. 6, 7, and 8, in a step 704, the main diagonal is traversed until the first non-zero entry is found. In the example illustrated in FIG. 8, this is element 802 which has a value of 103. In a step 708, the value in element 802 (the first non-zero element) is entered into an element 642 of the one-dimensional histogram 600 at the column number 622 corresponding to the column number 212 in which element 802 is found. Following the current example, the value 103 is entered into column 4. Because the values in the elements along the main diagonal to the left of element 802 are zero, zeros are entered in the elements 642 having column numbers 622 corresponding to column numbers 212. This is illustrated in FIG. 6 for columns 0–3.

In a step 712, the entry for the next horizontal location (in this example, location 5) is computed using an "L-shaped method." According to this method, the value for the next element along the main diagonal is summed with the value in the element above it and the value in the element to the right of it. In the current example, the value in element 5,5 (value=72) is summed with the value in element 4,5 (value=95) and the value in element 5,6 (value=61). This is illustrated by the L-shaped block 804A drawn around these three elements in FIG. 8. The sum of these three elements is two-hundred and twenty-eight (228).

In a step 716, the sum computed in step 712 is entered into the one-dimensional matrix at the element 642 of column number 622 corresponding to the column number 212 of the element 204 on the main diagonal of co-occurrence matrix 200. In the current example, the value 228 is entered into column 5 as illustrated in FIG. 6.

Steps 712 and 716 are repeated for each subsequent element along the main diagonal as illustrated by feedback line 762 in FIG. 7 and the L-shaped boxes 804B as illustrated in FIG. 8. Following the current example, these values are entered into the one-dimensional histogram 600 at columns 6–13.

Steps 712 and 716 are repeated until the last non-zero element 204 along the main diagonal is reached as illustrated by decision block 720. When the last non-zero element is reached, in a step 724, the value of this element 204 is summed with the value of the elements 204 above and below it. In a step 728, this sum is entered into the corresponding element 642 in one-dimensional matrix 600. In the current example, box 806 (FIG. 8) is drawn around the last non-zero element along the main diagonal and the elements with which it is summed. Twenty-nine, the value in this last element, is summed with nine and zero for a total of thirty-eight. This total is entered into one-dimensional histogram 600 at column 14.

In a step 732, one-dimensional histogram 600 is completed by entering zeros (0s) into the remaining horizontal locations. In the current example, the only location in which this occurs is that location corresponding to column 15.

The L-shaped method described above with reference to FIG. 7 is just one example of the way a one-dimensional histogram can be constructed. Alternative summation methods can be used to determine the values for one-dimensional histogram 600.

Referring again to FIG. 5, once one-dimensional matrix 600 is completed, the foreground and background peaks are determined in a step 508. The peaks can be determined simply by examining one-dimensional histogram 600 to determine which locations contain the numbers having the greatest value. For the example illustrated in FIG. 6, the peaks are at location 5 and location 13, as illustrated by circles 623 and 624, respectively. Thus for dark text on a light background, the foreground peak (for the text) is at graylevel 13 and the background is at graylevel 5.

A convention is adopted for use in discussing these peaks. For a one-dimensional histogram having M peaks, 0 to M, the peaks are called:

HistPeak[O] to HistPeak[M]

According to this convention, the value of HistPeak[M] is given by the graylevel of that peak of the histogram. For example, in one-dimensional histogram 600, the first peak, HistPeak[O] occurs at graylevel 5. The second peak HistPeak[1], occurs at graylevel 13.

Referring back to FIG. 1, once the peaks are determined in step 112, the operation continues at a step 116. In step 116, features of the peaks are ascertained. The features are used to determine characteristics of the foreground and background of the page. For example, the features are used to determine whether the text (or line in a line drawing) is thin, normal, or thick, and whether the background is weak or strong. The features determined can include the extent of the peaks, the deviation of the foreground peak, and the delta between the peaks.

Figure 9:
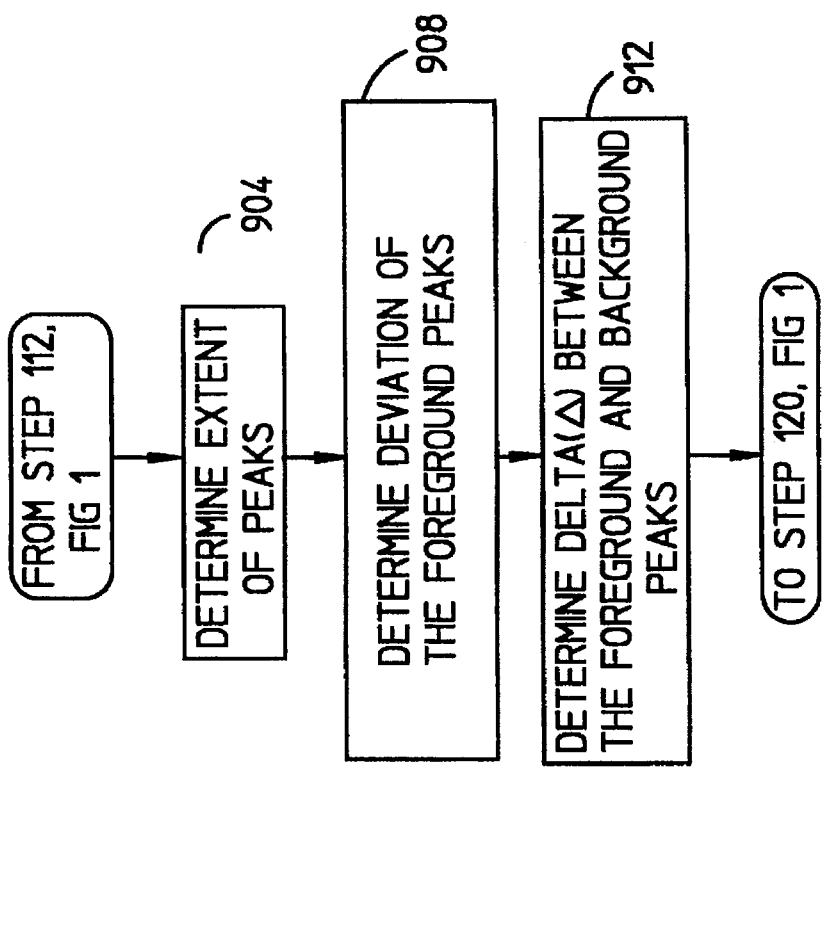
FIG. 9 is an operational flow diagram illustrating the manner in which features of peaks are determined.

The manner in which the features are ascertained is now described. FIG. 9 is an operational flow diagram illustrating the manner in which peak features are determined. Referring now to FIG. 9, in a step 904, the extent of each of the peaks is determined. The extent indicates how sharp (or conversely how broad) the peaks are. The extent of the background peak is indicated as BkndExt. Similarly, the extent of the foreground peak is indicated as FgndExt.

One way to determine the peak extent is to examine one dimensional histogram 600 at the peak and to examine adjacent elements. The peak is compared with adjacent elements to determine if the peak is broad or sharp. If an adjacent element is greater than or equal to one-half the value of the peak element, it is included in the extent. If, on the other hand, it is less than one-half the value of the peak it is not included in the extent and the process stops. If an adjacent element is included in the extent, the element adjacent to that element is also examined. If that element is greater than or equal to one-half the value of the peak it is included in the extent. This process continues until no more elements are found that can be included in the extent.

Although any convention could be used, the value of the extent is deemed to be zero (0) if the peak spans only one element, and is incremented by one (1) for each additional element included in the extent. Thus, theoretically, the extent could range from zero (0) to fifteen (15) for the illustrated example.

The one-dimensional histogram 600 provides an example of peak extent. In this example, there are no elements adjacent to either peak that are greater than or equal to one half the value of the peak. Therefore, both peaks have an extent of zero (0).

Figure 10:
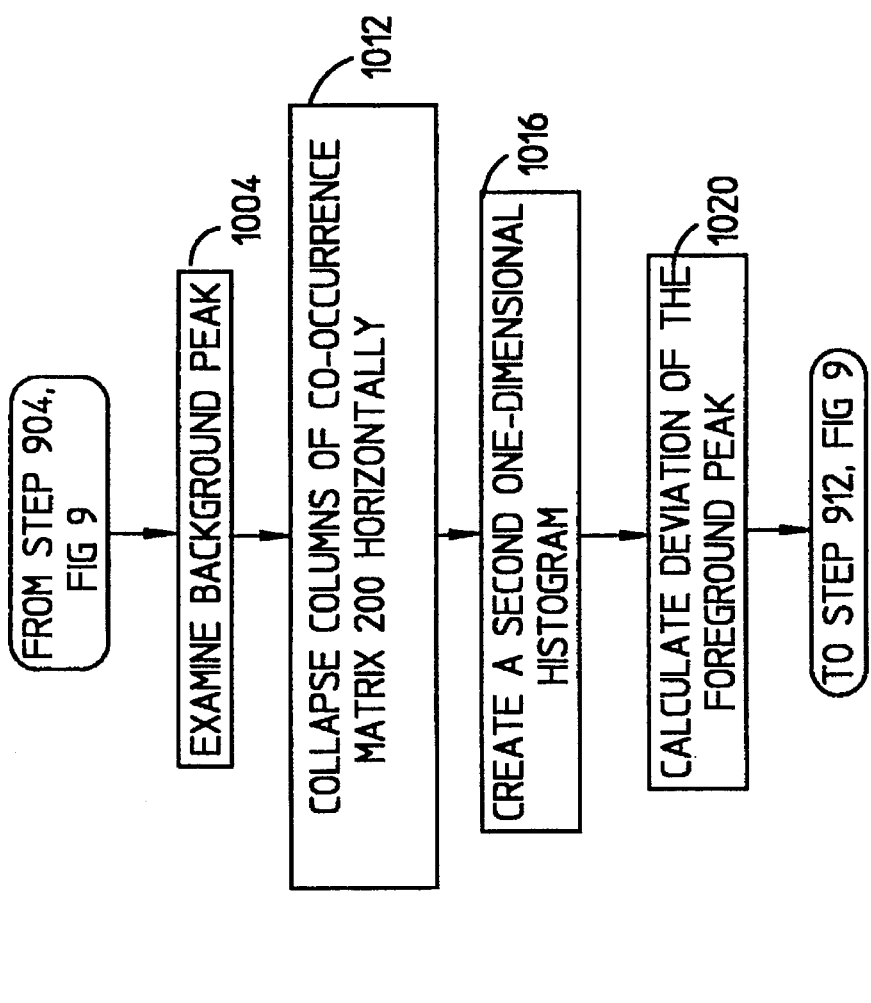
FIG. 10 is an operational flow diagram illustrating the manner in which the deviation of the foreground peak is determined.

In a step 908, the deviation of the peaks is determined. In a preferred embodiment, only the deviation of the foreground peak is determined. The manner in which the deviation of the foreground peak is determined is illustrated in FIG. 10. Referring now to FIG. 10, in a step 1004, the background peak is examined. If it is at a graylevel less than or equal to a specified value (3 in a preferred embodiment), the columns of the co-occurrence matrix are collapsed horizontally by three ahead and one behind the column of the foreground peak. This is illustrated in step 1012. If, on the other hand, the background peak is at a graylevel greater than the specified value (3 in a preferred embodiment), the co-occurrence matrix is collapsed horizontally by one column ahead and one column behind the column of the foreground peak.

In a step 1016, the collapsed matrix is used to create a second one-dimensional histogram. This second one-dimensional histogram is created by summing the values in elements of selected portions of the rows of co-occurrence matrix 200. Each sum is stored in a column of the second one-dimensional histogram that corresponds to the row summed.

Figure 12:
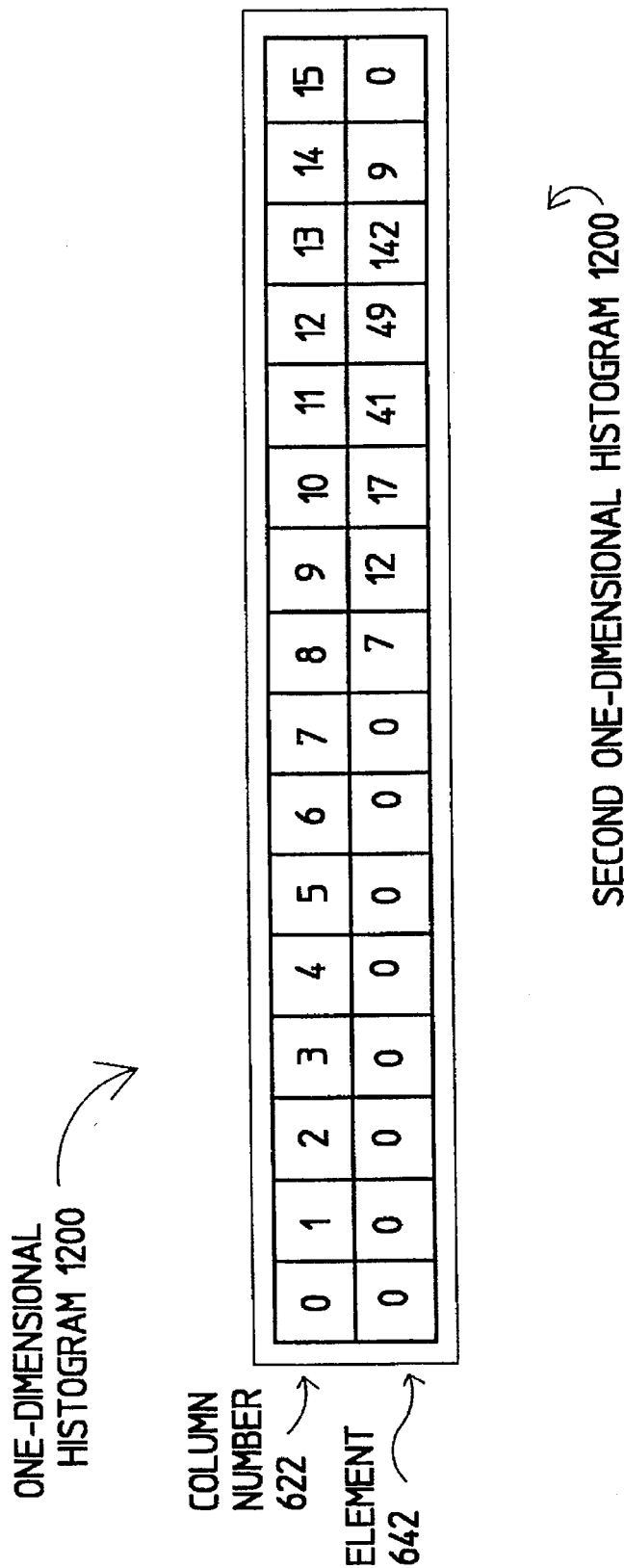
FIG. 12 illustrates an example of a second one-dimensional histogram constructed from the collapsed co-occurrence matrix illustrated in FIG. 11.

The manner in which this second one-dimensional histogram is created is further described by way of example. Continuing with the same example wherein the foreground peak is at a graylevel 13 and the background peak is at a graylevel 4, the collapse of the example co-occurrence matrix 400 is illustrated again in FIG. 11, and the resultant second one-dimensional histogram 1200 is illustrated in FIG. 12. Each row of co-occurrence matrix 400 is read. The elements 204 of each row that lie within the columns to be collapsed are summed for that row. The sum is stored in the appropriate element 642 of one-dimensional histogram 1200. The appropriate element 642 is the one corresponding to the column number 622 of histogram 1200 that is the same as row number 208 of co-occurrence matrix 200. In the illustrated example, for row 8 of example co-occurrence matrix 400, the values seven (7), zero (0) and zero (0) are summed. The resultant sum, seven (7), is stored in column 8 in histogram 1200. Similarly, for row 9, the sum 12 is entered into column 12 of histogram 1200.

In a step 1020 the deviation of the foreground peak can be calculated using the following equation:

$$D = \frac{\left(\sum_{x=0}^{x=p} f(x)(p-x)\right) * 10}{\sum_{x=0}^{x=p} f(x)}$$

where the summation is executed over the values of x equal to zero (0) to x equal to p. Where x is the column number 622 of the second one-dimensional histogram 1200, p is the column number 622 of the foreground peak, and f(x) is the value in column x.

Computing the deviation for the current example yields:

$$\frac{(7*5)+(12*4)+(17*3)+(41*2)+(49*1)}{7+12+17+41+49+142} * 10 = 9.8$$

In a step 912 the peak graylevels and the extent are used to calculate the delta between the foreground peak and the background peak as follows:

$$\Delta = FgndPk - BkndPk + BkndExt - FgndExt$$

Where FgndPk is the graylevel of the foreground peak, BkndPk is the graylevel of the background peak, BkndExt is the background peak extent, and FgndExt is the foreground peak extent. Again, following the same example, where the foreground peak is at graylevel 13, and the background peak is at graylevel 4, and the extent of both peaks is zero (0), the delta is nine (9).

Figure 13:
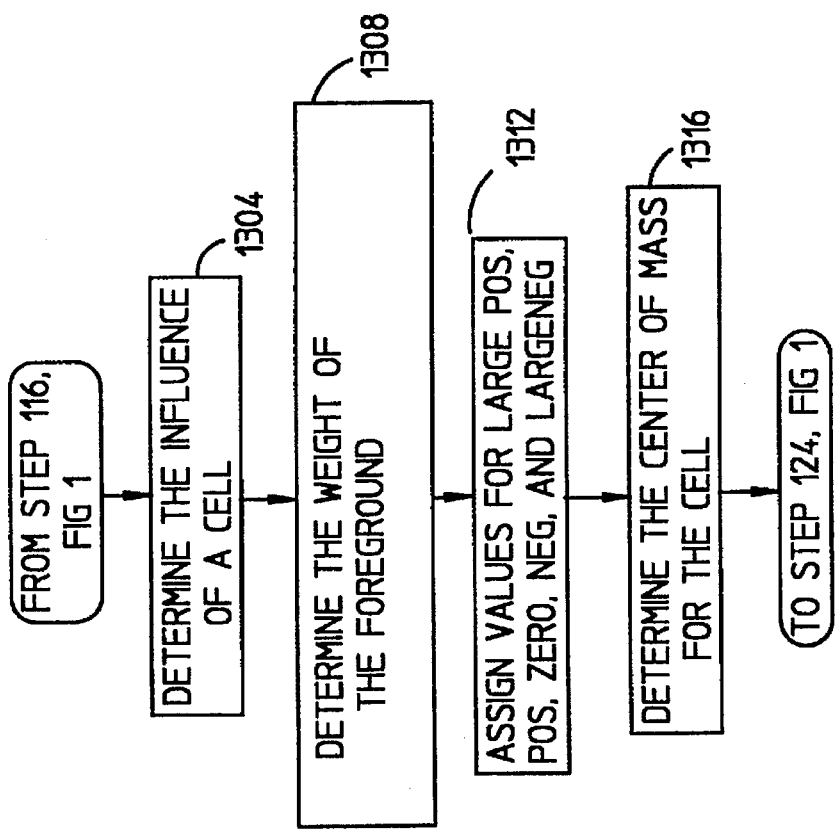
FIG. 13 is an operational flow diagram illustrating the manner in which the center of mass for the cell is determined.

In a step 120, the center of mass of the peaks is determined. The manner in which the center of mass is determined is illustrated in the operational flow diagram of FIG. 13. Referring now to FIG. 13, in a step 1304, the influence of the cell is determined. The influence is used to indicate how much data from the background of the image has an effect on the foreground data. Values for influence are assigned based on the delta. The manner in which influence values assigned for a preferred embodiment are illustrated in FIG. 14.

Referring now to FIG. 14, if the delta is less than or equal to 4, a strong influence is given a value of ten, and normal and weak influence are given values of zero. If the delta is five strong influence and normal influence are assigned a value of five, and the weak influence is assigned a value of zero. For a delta of six, a normal influence is given a value of ten and the strong influence and weak influence are assigned a value of zero. For a delta of seven, the strong influence value is zero, and the normal influence and weak influence values are five. For a delta of eight or higher, the values for strong influence and normal influence are zero, and the value for weak influence is ten.

Figure 16:
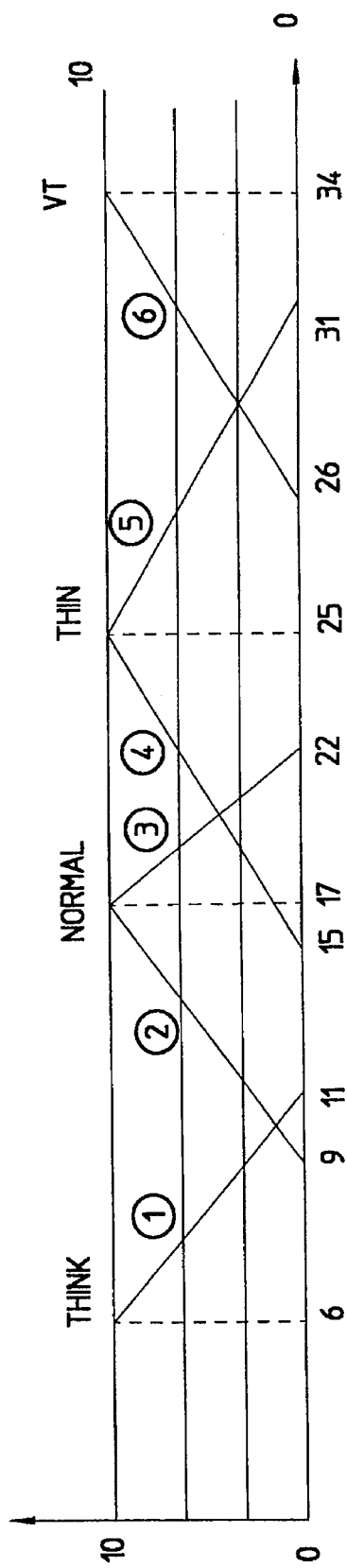
FIG. 16 is a diagram illustrating in graphic format the foreground weight for various deviation values in one embodiment of the invention.

In a step 1308, the weight of the foreground is determined. This determination is made based on the deviation calculated in step 1020 above. The manner in which the foreground weight is determined for a preferred embodiment is illustrated in FIG. 15. A graphical representation of how these weights are assigned is illustrated in FIG. 16.

For a deviation of less than seven, a thick weight is assigned a value of ten, and normal thin, thin, and very thin weights are assigned a value of zero. For deviations of less than 18, the value of the thick weight is minus 2x+22. If however this value is less than zero, or greater than 10, it is set to zero. For a deviation of less than 18, the normal weight is equal to (5z–45)/4, where x is the deviation. Again, if this value is less than zero or greater than 10, it is set to zero. For deviations of less than 18 the values for thin and very thin are set to zero.

If the deviation is less than 26, values for thick and very thin are set to zero. The value for the normal weight is minus 2x+44, where x is the deviation. If this value is less than zero or greater than ten, it is set to zero. For deviations less than 26 the thin weight is minus x minus 15, where x is the deviation. For values less than zero and greater than 10, the thin weight is set to zero.

For deviations less than 35, the thick weight and normal weight are set to zero. The thin weight is set to (minus 10x+310)/6, where x is the deviation. If this value is less than zero or greater than ten, it is set to zero. For a deviation less than 35, the very thin weight is set to (5x–130)/4, where x is the deviation. If this value is less than zero or greater than ten it is set to zero.

In a step 1312 values for the variables LargePos, Pos, Zero, Neg, and LargeNeg are assigned. In one embodiment, the assignment is made based on the following rules:

Rule 1:

LargePos=0

Rule 2:

Pos=maximum of:
   the minimum of Thick or Strong Influence; and
   the maximum of:
      the minimum of Thick or Normal Influence
      the minimum of Thick or Weak Influence
      the minimum of Normal or Strong Influence Rule 3:

Zero=the maximum of:
   the minimum of Normal or Normal Influence
   the minimum of Normal or Weak Influence
   the minimum of Thin or Strong Influence Rule 4:

Neg=the maximum of:
   the minimum of Thin or Normal Influence
   the minimum of Thin or Weak Influence
   the minimum of Very Thin or Strong Influence Rule 5:

LargeNeg=maximum of:
   the minimum of Very Thin or Normal Influence
   the minimum of Very Thin or Weak Influence In a step 1316 the center of mass is determined. According to one embodiment, the center of mass O is defined by:

$$O = \frac{((Large\ Pos * 2) + (Pos * 4) + (Zero * 6) + (Neg * 8) + (LargeNeg * 10)) * 10}{LargePos + Pos + Zero + Neg + LargeNeg}$$

Returning again to FIG. 1, in a step 124, the center of mass and the histogram peak values are used to determine the threshold. The threshold is determined differently for different center of mass values. The manner in which the threshold is determined for the different center of mass value ranges is now described.

For center of mass values $0 \leq O \leq 25$, the THRESHOLD is given by:

$$\frac{HistPeak[0] + HistPeak[1] + BkndExt - FgndExt + 1}{2} + 2$$

If the THRESHOLD is $\geq$ Histpeak[1], then:

THRESHOLD=THRESHOLD-1

For center of mass values $25 < O \leq 35$, the THRESHOLD is given by:

$$\frac{HistPeak[0] + HistPeak[1] + BkndExt - FgndExt + 1}{2} + 1$$

If the THRESHOLD is $\geq$ Histpeak[1], then:

THRESHOLD=THRESHOLD-1

For center of mass values $35 < O \leq 45$, the THRESHOLD is given by:

$$\frac{HistPeak[0] + HistPeak[1] + BkndExt - FgndExt + 1}{2}$$

for center of mass values $45 < O \leq 80$, the THRESHOLD is given by:

$$\frac{HistPeak[0] + HistPeak[1] + BkndExt - FgndExt + 1}{2} - 1$$

If the THRESHOLD is $\leq$ zero (0), then:

THRESHOLD=HistPk[O]+BkndExt+4

For center of mass values $80 < O \leq 85$, the THRESHOLD is given by:

$$\frac{HistPeak[0] + HistPeak[1] + BkndExt - FgndExt + 1}{2} - 2$$

If the THRESHOLD is $\leq$ zero (0), then:

THRESHOLD=HistPk[O]+BkndExt+3

For center of mass values $85 < O \leq 90$, the THRESHOLD is given by:

HistPeak[O]+2

If the THRESHOLD is $\geq$ HistPk[1], then:

THRESHOLD=HistPk[O]+1

For center of mass values $O > 90$, the THRESHOLD is given by:

HistPeak[O]+1

Once the threshold has been found for the cells, a high-level reasoning step takes place to remove any anomalies, or "glitches," that may have arisen in the threshold determination process. In this step, each cell is examined in conjunction with neighboring cells. In a preferred embodiment, each cell is examined along with the 24 cells immediately surrounding it (i.e., the subject cell is the center cell of a 5×5 matrix of cells). The features of the cells are examined as well as the threshold for each cell determined as described above. If the threshold of the subject cell appears to be quite different from that of the surrounding cells, it may be changed. For example, if the subject cell has a threshold of seven and the surrounding cells all have a threshold of two, the threshold determined for the subject cell is considered to be anomalous and changed to two. One possible cause for such an anomaly could be unwanted noise in the system. This process is similar to smoothing a line on a line graph by discarding anomalous dam points.

One embodiment of this upper level reasoning process is fully described in U.S. Pat. No. 5,179,599 to Formanek (hereinafter '599), which is incorporated herein by reference. Specifically, beginning with column 7, line 31, the '599 patent describes using data from surrounding cells to reduce the effects of noise. Further, at column 8 line 15, through column 10, line 20, the '599 patent describes a calculate threshold software module. Still further, the '599 patent at column 10, line 20, through the end, describes a re-scan process that uses the threshold for each cell and re-processes data in a memory buffer.

3. Example Implementation

Figure 17:
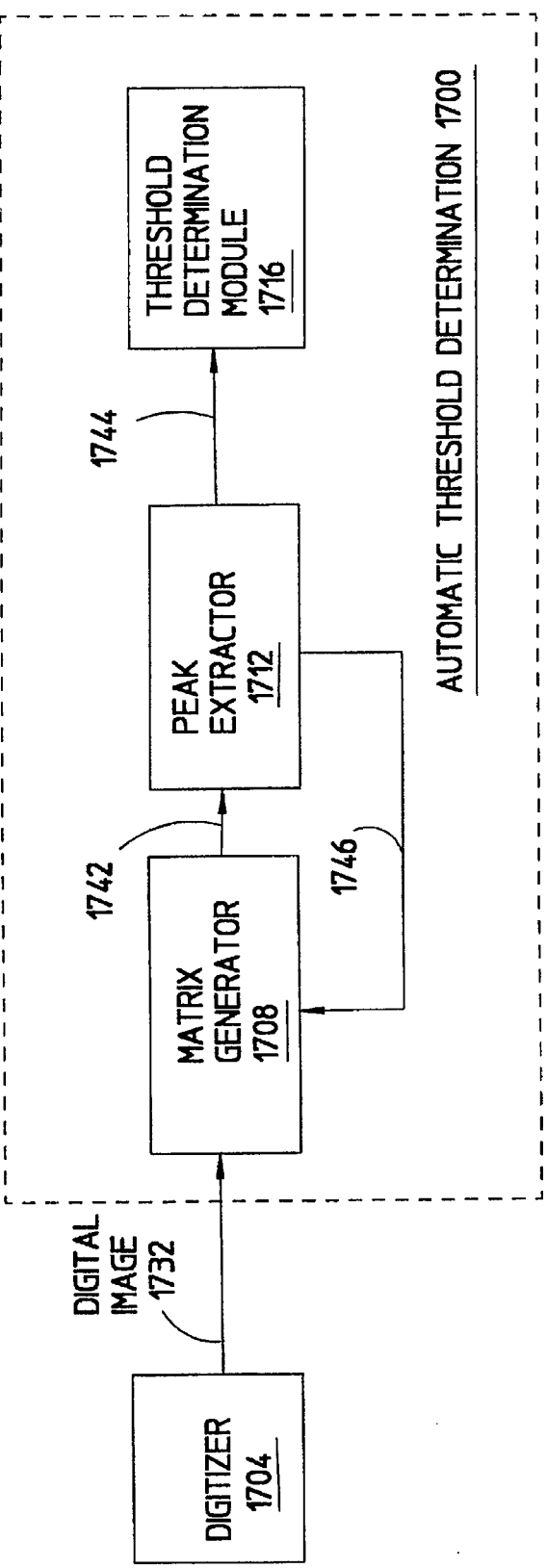
FIG. 17 is a diagram illustrating a representative architecture of an automatic threshold determination system.

A representative architecture for an automatic threshold determination system is illustrated in FIG. 17. Referring now to FIG. 17, according to the representative architecture an automatic threshold determination system 1700 includes a matrix generator 1708, a peak extractor 1712, and a threshold determination module 1716.

Automatic threshold determination system 1700 accepts a digital image 1732. Digital image can, for example, be generated by a digitizer 1704 such as a digitizing scanner. In the case of a bed scanner, a page, or portion thereof, is scanned to create digital image 1732. Digital image 1732 uses a plurality of bits to represent a graylevel of each pixel of the image. Digital image 1732 is grouped into cells, where each cell is a subset of the entire image 1732.

Matrix generator 1708 provides the capability to generate co-occurrence matrix 200 and the first one-dimensional histogram. Co-occurrence matrix 200 and the first one dimensional histogram are provided to peak extractor 1712 via path 1742. Information regarding the graylevel of the background peak is provided to matrix generator 1708 via path 1746. Matrix generator 1708 uses this information to cream a second one dimensional histogram which is also provided to peak extractor 1712.

Peak extractor 1712 determines the foreground and background peaks and also determines the peak features and the center of mass of each cell. The center of mass and peak features are provided to threshold module via path 1744. Threshold determination module 1716 uses this information to determine the optimum threshold level for each cell.

4. Conclusion

While various embodiments of the present invention have been described above, it should be understood that they have been presented by way of example only, and not limitation. Thus, the breadth and scope of the present invention should not be limited by any of the above-described exemplary or representative embodiments, but should be defined only in accordance with the following claims and their equivalents.

What is claimed is:

1. A computer-based method for automatically determining a threshold level for a cell of a digital image representation of a document, the digital image being divided into one or more cells where each cell has a plurality of pixels and each pixel has associated therewith a plurality of bits to represent a graylevel for that pixel, wherein the threshold level is used to convert the plurality of bits to a one-bit-per-pixel representation of a graylevel, comprising the steps of:

(a) scanning the document to form the digital image representation of the document in a computer memory;

(b) constructing a co-occurrence matrix for each cell indicating a quantity of each different pixel graylevel pair;

(c) determining a background and a foreground peak for each cell based on said co-occurrence matrix;

(d) determining features of each cell;

(e) determining a center of mass for each cell based on said features;

(f) determining the threshold level for each cell based on said center of mass;

(g) comparing the threshold level to the graylevel of each of the plurality of pixels in each cell; and (h) setting the pixel graylevel to a first value of a one bit representation if the graylevel of the pixel is greater than the threshold level, and setting the pixel value to a second value of a one bit representation of the graylevel of the pixel is less than the threshold level, thereby converting the plurality of bits to a one-bit-per-pixel representation of the graylevel for each oft he plurality of pixels in each cell.

2. The method of claim 1, further comprising the step of repeating said steps (b) through (h) for each cell of the document to thereby convert the plurality of bits to a one-bit-per-pixel representation of the graylevel for each cell of the document.

3. The method of claim 1, wherein said step (b) comprises the steps of i. initializing said co-occurrence matrix for the cell;

ii. determining pixel graylevel pairs for the cell; and iii. updating said co-occurrence matrix for each pixel graylevel pair.

4. The method of claim 3, further comprising a step after said step (b) of collapsing said co-occurrence matrix and constructing a one-dimensional histogram from said collapsed co-occurrence matrix.

5. The method of claim 1, further comprising a step after said step (b) of summing proximate elements of said co-occurrence matrix and using said sums to construct a one-dimensional histogram.

6. The method of claim 5, wherein construction of said one-dimensional histogram comprises the steps of:

(i) traversing a diagonal of said co-occurrence matrix until a first non-zero element is reached;

(ii) entering the value of said first non-zero element into an element of said one-dimensional histogram corresponding to a column number of said first non-zero element;

(iii) if an additional non-zero element exists along said diagonal, starting with said additional non-zero element, summing said proximate elements;

(iv) entering the summed value of said proximate elements into an element of said one-dimensional histogram corresponding to a column number of said next non-zero element; and (v) repeating said steps (iii) and (iv) for each said additional nonzero element.

7. The method of claim 6, further comprising the step of entering a value of zero into each element of said one-dimensional histogram that does not have a value entered therein as a result of said steps (i) through (v).

8. The method of claim 6, wherein said proximate elements are summed using an L-shaped method.

9. The method of claim 1, wherein said step (d) comprises the steps of:

(i) determining an extent for each of said peaks determined in said step (c);

(ii) determining a deviation of said foreground peak determined in said step (c); and (iii) determining a delta between said foreground and said background peak determined in said step (c).

10. The method of claim 9, wherein said step (ii) comprises the steps of:

(1) examining said background peak to determine if a graylevel of said foreground peak is less than a specified value;

(2) collapsing columns of said co-occurrence matrix horizontally based on said graylevel of said foreground peak;

(3) constructing a one dimensional histogram using said collapsed co-occurrence matrix; and (4) calculating a deviation of said foreground peak using said one-dimensional histogram constructed in said step (3).

11. The method of claim 10, wherein said deviation, D, is calculated as:

$$D = \frac{\left( \sum_{x=0}^{x=p} f(x)(p-x) \right) * 10}{\sum_{x=0}^{x=p} f(x)}$$

wherein x is a column number of said one-dimensional histogram, p is a column number for the foreground peak, and f(x) is a value in column x.

12. The method of claim 1, wherein said step (e) comprises the steps of:

(i) determining an influence of the cell;

(ii) determining a weight of a foreground of the cell; and (iii) determining a center of mass for the cell based on said influence of the cell and on said weight.

13. An automatic threshold determination system for determining a threshold level for a cell of a digital image representation of a document, the digital image being divided into one or more cells where each cell has a plurality of pixels and each pixel has a plurality of bits to represent a graylevel of the pixel, wherein the threshold level is used to convert the plurality of bits to a one-bit-per-pixel representation of a graylevel, comprising:

(a) a digitizer configured to generate the digital image;

(b) a matrix generator, configured to receive the digital image from said digitizer and to generate a co-occurrence matrix and a one-dimensional histogram based on said co-occurrence matrix;

(c) a peak extractor, coupled to said matrix generator, configured to receive said one-dimensional histogram and to extract peak features and peak centers of mass for each cell from said one-dimensional histogram;

(d) a threshold determination module, coupled to said peak extractor, configured to determine the threshold level for each cell using said peak centers of mass and said peak features; and (e) a comparator configured to compare the threshold level to the graylevel of each of the plurality of pixels in the cell and to set the pixel graylevel to a first value of a one bit representation if the graylevel of the pixel is greater than the threshold level, and to set the pixel value to a second value of a one bit representation if the graylevel of the pixel is less than the threshold level, thereby converting the plurality of bits to a one-bit-per-pixel representation of the graylevel for each of the plurality of pixels in the cell.

14. The automatic threshold determination system of claim 13, wherein said digitizer is a flatbed scanner.

15. A computer-based system for automatically determining a threshold level for a cell of a digital image representation of a document, the digital image being divided into one or more cells and each cell having a plurality of pixels and each pixel having associated therewith a plurality of bits to represent a graylevel for that pixel, wherein the threshold level is used to convert the plurality of bits to a one-bit-per-pixel representation of a graylevel, comprising:

first means for scanning the document to form the digital image representation of the document in a computer memory;

second means for constructing a co-occurrence matrix for each cell indicating a quantity of each different pixel graylevel pair;

third means, coupled to said second means, for extracting a background and a foreground peak for each cell based on said co-occurrence matrix constructed by said second means and for determining features of said peaks extracted by said third means;

fourth means, coupled to said third means for determining a center of mass for each cell based on said features;

fifth means, coupled to said third and fourth mesas for determining the threshold level for each cell;

sixth means for comparing the threshold level to the graylevel of each of the plurality of pixels in each cell; and seventh means for setting the pixel graylevel to a first value of a one bit representation if the graylevel of the pixel is greater than the threshold level, and setting the pixel value to a second value of a one bit representation of the graylevel of the pixel is less than the threshold level, thereby converting the plurality of bits to a one-bit-per-pixel representation of the graylevel for each of the plurality of pixels in each cell.

16. The computer based system of claim 15, wherein said second means further comprises means for constructing a one-dimensional histogram based on said co-occurrence matrix.

* * * * *

UNITED STATES PATENT AND TRADEMARK OFFICE
CERTIFICATE OF CORRECTION

PATENT NO. : 5,651,077
DATED : 7/22/97
INVENTOR(S) : Mimi Chu Dong, et al.

It is certified that error appears in the above-indentified patent and that said Letters Patent is hereby corrected as shown below:

Column 1, line 11, "elow" should read --below--.

Column 11, line 38, "for" should read --For--.

Claim 1, Column 13, line 28, "of the" should read --if the--;
                line 31, "oft he" should read --of the--.

Claim 15, Column 16, line 9, "mesas" should read --means--; and
                line 19, "of the" (first instance) should read
                --if the--.

Signed and Sealed this

Twenty-third Day of November, 1999

Attest:

Q. TODD DICKINSON

*Attesting Officer*       *Acting Commissioner of Patents and Trademarks*